Sept. 3, 1968 M. C. KLAPES 3,399,756
COUNTING MACHINE WITH ADJUSTABLE ARTICLE
CHANNELING MECHANISM
Filed Feb. 24, 1967 5 Sheets-Sheet 1

INVENTOR.
MICHAEL C. KLAPES
BY
Nicholas A. Pendisio
ATTORNEY

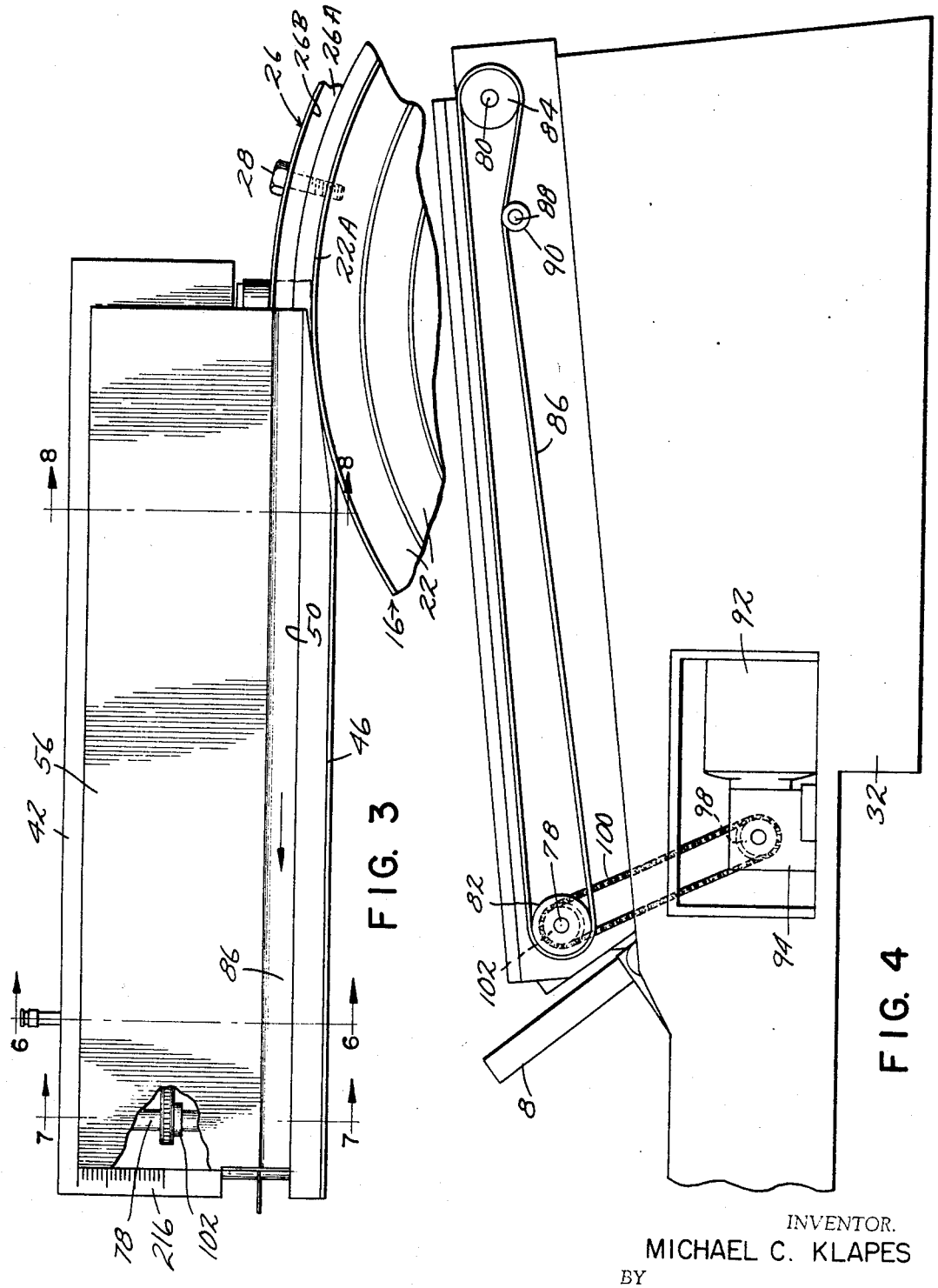

INVENTOR.
MICHAEL C. KLAPES

Sept. 3, 1968 M. C. KLAPES 3,399,756
COUNTING MACHINE WITH ADJUSTABLE ARTICLE
CHANNELING MECHANISM
Filed Feb. 24, 1967 5 Sheets-Sheet 4

INVENTOR.
MICHAEL C. KLAPES
BY
ATTORNEY

Sept. 3, 1968 M. C. KLAPES 3,399,756
COUNTING MACHINE WITH ADJUSTABLE ARTICLE
CHANNELING MECHANISM
Filed Feb. 24, 1967 5 Sheets-Sheet 5

INVENTOR.
MICHAEL C. KLAPES
BY
ATTORNEY

United States Patent Office 3,399,756
Patented Sept. 3, 1968

3,399,756
COUNTING MACHINE WITH ADJUSTABLE
ARTICLE CHANNELING MECHANISM
Michael C. Klapes, Lynnfield, Mass., assignor to
Delta Engineering Corporation, a corporation of
Massachusetts
Filed Feb. 24, 1967, Ser. No. 618,497
11 Claims. (Cl. 198—39)

ABSTRACT OF THE DISCLOSURE

This patent specification describes a machine for counting and batching articles and presents improvement over the apparatus disclosed in U.S. Patents Re. 25,013 and 3,001,636. The machine has a vibratory feeder that delivers articles to a moving conveyer belt, guide means that can be adjusted to define a channel along which the articles are advanced in single file by the conveyer, means for detecting and counting articles transported by the conveyer, and means for batching the articles in groups of predetermined number. The guide means consists of a fixed guide and a moveable guide, plus means for moving the moveable guide to vary the width of the article channel. Means also are provided for moving the detector means and the batching means in the same direction as the moveable guide so as to maintain them centered with respect to the article channel.

This invention relates to machines for counting and batching articles at high speeds and more particularly to improvement in mechanism of the type disclosed in my prior U.S. Patent No. 3,001,636, issued Sept. 26, 1961, for "Apparatus for Channeling Articles."

Counting machines of the type to which this invention pertains are well known in the art (see for example, U.S. Patent Re. 25,013, issued July 25, 1961, to Eric G. Cleveland et al. for "Apparatus for Counting and Packaging Articles"). These machines have wide utility and are used, for example, in the hardware and drug industries to facilitate filling each of a series of containers with a predetermined number of articles. Essentially such machines comprise a supply hopper adapted to receive a loose supply of articles to be counted, feeder means for discharging the articles from the hopper, means for advancing the discharged articles one by one to a batching station, a light beam detector unit located upstream of the batching station for sensing each article as it advances to the batching station, and means responsive to the detector unit for counting each sensed article. The means for advancing the articles to the batching station includes a continuously moving endless conveyer belt and a guide system comprising a pair of guide members that define a channel along the belt just wide enough to accommodate the articles in single file. In order to enable one machine to handle articles of different shapes and sizes, e.g. medicinal tablets, capsules, rivets, screws, etc., it is necessary to make the guide mechanism adjustable with respect to the width of the article channel.

My prior Patent 3,001,636 describes a guide mechanism designed so that changes in channel width can be made quickly and without shifting the channel's center line with respect to a fixed detector unit. Maintaining the channel aligned with the light beam detector unit is necessary in order to achieve optimum operation of the detector means. In my prior guide mechanism this is achieved by having two moveable guide members and means for moving both guide members equal amounts with respect to the center line of the channel along which the articles travel. This arrangement is fully satisfactory except where the counting machine embodies a feeder of the type comprising a circular supply bowl with a helical ramp and a vibrator unit for vibrating the bowl so that articles in the bowl will advance along the ramp in single file to a point of discharge. Vibratory feeder mechanisms are well known in the art and offer a number of advantages, including little or no article damage, reliability, and adjustability of feeding rate. However, my prior guide mechanism is not completely satisfactory when used in conjunction with vibratory feeders. In this connection it is to be noted that the vibrator unit must be anchored on a fixed support so that the point of discharge of the ramp is fixed and one of the two guide members should always be substantially aligned with the outer edge of the ramp in order that the movement of articles from the bowl to the conveyer belt be smooth and controlled. However, this is not always possible if both guide members are moveable, with the result that in certain positions the guide members may actually interfere with rather than guide the articles as they are discharged from the bowl.

Accordingly the primary object of this invention is to provide for use in machines of the character described, an improved adjustable guide mechanism that overcomes the above-mentioned limitation of my prior guide mechanism disclosed in U.S. Patent No. 3,001,636.

It has been determined that the above-mentioned limitation may be eliminated by using a guide mechanism wherein one guide member is moveable and the other guide member is fixed, provided, however, that the light beam detector unit and the batcher unit are also moveable so that their relationship with the center line of the article channel can be maintained constant.

Accordingly a more specific object of this invention is to provide an article counting machine that comprises an article guide mechanism having one fixed guide member and another moveable guide member, a moveable article detector unit for detecting each article as it passes through a predetermined counting station, and means connecting the guide mechanism and the article detector unit whereby a change in position of the moveable guide member is accompanied by a proportional change in the position of the article detector unit, or vice versa.

Other objects and many of the attendant advantages of this invention are apparent from the following detailed specification which is to be considered together with the accompanying drawings, wherein:

FIG. 3 is a fragmentary plan view;

FIG. 4 is an enlargement of a portion of FIG. 1, but with certain panels removed to show the conveyer belt assembly and its motor drive;

Figure 1:
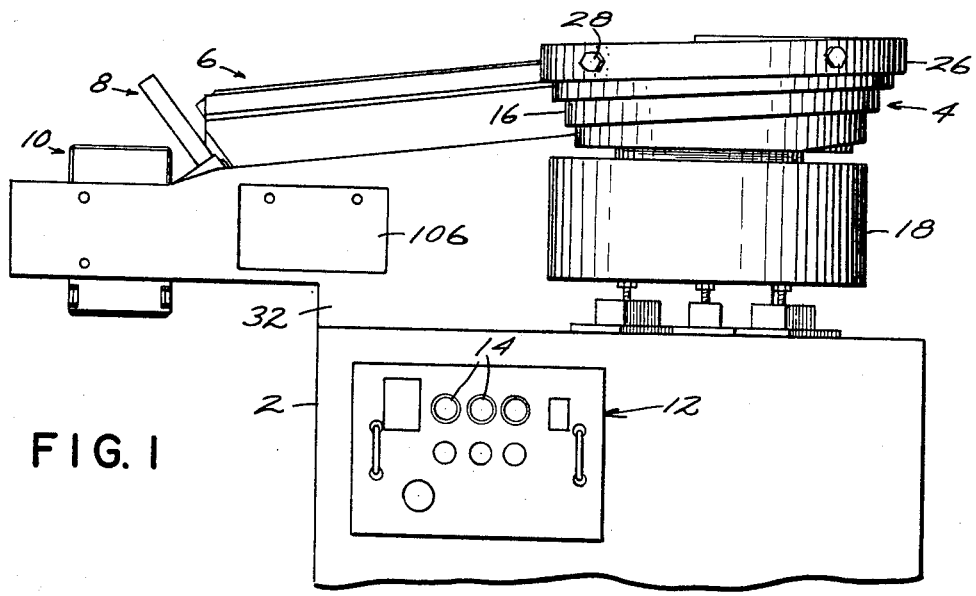
FIG. 1 is a fragmentary side view in elevation of an article counting and batching machine embodying my invention.

Referring now to FIGS. 1 and 3, there is shown an article counting machine embodying the preferred form of the invention. The machine comprises a base in the form of a cabinet 2 that supports article handling apparatus comprising a vibratory feeder assembly 4, a channeling and conveyer assembly 6, a detector unit 8, and a batcher assembly 10. Mounted within the cabinet 2 is a conventional electronic counter illustrated generally at 12. Although not shown, it is to be understood that the counter is connected electrically to detector unit 8 and batcher assembly 10 and that it includes a plurality of decade counting circuits as well as a power supply for such circuits and also for the detector unit and the batcher assembly. It is to be understood also that the counter is adapted to count electrical pulses generated in response to articles sensed by detector unit 8 and to initiate operation of the batcher assembly each time a predetermined count is reached. This mode of operating the batcher assembly is well known as exemplified by the aforementioned patent Re. 25,013. For operator convenience the counter preferably includes a plurality of numeric display units represented schematically at 14, one for each decade of count. Such display units may be of the type embodying Dekatron® tubes which are commercial products of Baird Atomic, Inc. of Waltham, Mass.

Figure 2:
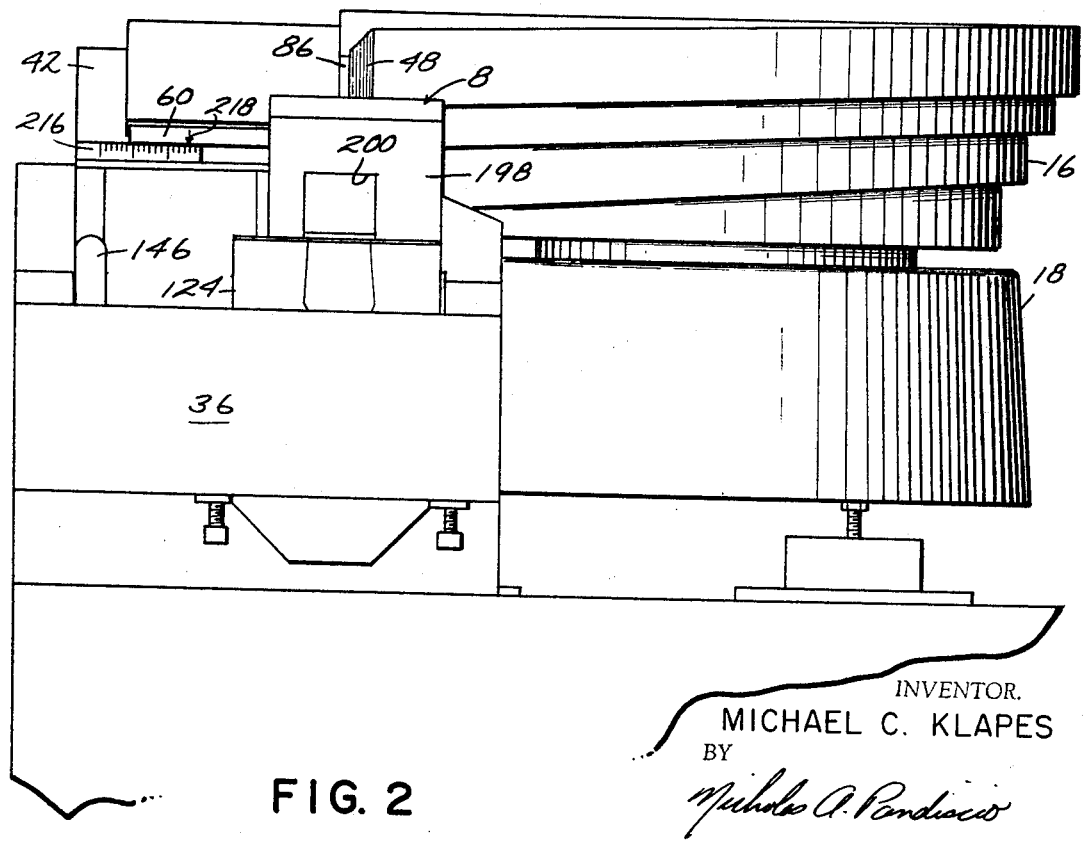
FIG. 2 is a fragmentary view in front elevation of the same machine on an enlarged scale.

As illustrated in FIGS. 1, 2, and 3, the vibratory feeder assembly 4 comprises a bowl 16 that is mounted on an electrically powered vibrator unit 18. Bowl 16 is stepped as shown in FIG. 1 so as to provide a helical ramp 22 (FIG. 3) extending along the interior surface of its side wall. The side wall of the ramp is vertical while the floor of the ramp, i.e., the surface on which the articles travel, makes an angle of about 83° with its vertical wall. The ramp commences near the bottom of the bowl and runs counterclockwise up to the top of the bowl. At its upper end the wall of the bowl is fitted with a removeable extension 26 that is held in place by bolts 28 that screw into tapped holes provided in the aforesaid wall. As explained in greater detail below this extension is designed to function as a part of ramp 22. Articles to be counted are dumped into the bowl by hand or by a bucket conveyer. It is to be understood that the vibrator unit is adapted to be connected to a suitable power source and that its control circuit embodies a suitable controller (not shown) for varying its operation so as to modify the rate at which articles are caused to travel along ramp 22 to a point of discharge at the upper end of the channeling and conveyer assembly 6. By way of example, the vibrator unit may comprise a model VBF–20–L vibrating driver and a model VBC–30S controller, both made by Arthur G. Russell Co. of Bristol, Conn., under the trademark Vibro-block.

The channeling and conveyer assembly 6, the detector unit 8, and the batcher assembly 10 are all mounted on a vertical extension 2A of the base 2. This vertical extension includes a frame that comprises as an integral part thereof two parallel top side plates 38 and 40 (FIGS. 5–8). Disposed below and attached to plates 38 and 40 are two bottom side plates 28 and 30 which normally are concealed from view by side cover panels 32 and 34 (FIGS. 1 and 6), a front panel 36 (FIG. 1) and a rear panel (not shown). The upper edges of the top side plates 38 and 40 are inclined from front to back. Overlying the top side plates 38 and 40 and secured thereto is a flat top plate 42 that projects laterally beyond side plate 38. A skirt 44 is affixed to the overhanging edge of top plate 42. This skirt engages and forms a continuation of side cover panel 32. Affixed to the upper side of plate 42 and extending along its outer edge is a stationary article guide member 46 that is of triangular cross-section and is characterized by an inclined surface 48 and a straight article guiding inner edge 50. As shown at 52 in FIG. 3 the upstream end of guide member 46 is bevelled to facilitate positioning relative to the discharge point of ramp 22.

Cooperating with guide member 46 is a second guide member 56 that is formed of sheet metal and has a vertical article guiding surface 58. Guide member 56 is screwed to a support block 60 that is substantially coextensive in length with top plate 42. The support block 60 is slidable on the top plate 42 so that the guide surface 58 can be moved closer to or further from the fixed guide member 56. The two guide members together define an article guide channel 62. The support block 60 is provided with two vertically extending holes sized to accommodate pins 64 which are radial extensions of like nuts 66 and 68. Plate 42 is provided with two elongated slots that extend at right angles to fixed guide member 46. These slots are large enough to allow pins 64 to move back and forth with respect to guide member 46. Nuts 66 and 68 are screwed onto identical threaded portions 70 and 72 of like shafts 74 and 76 which are rotatably anchored in the side plates 38 and 40. Rotation of these shafts in the same direction and at the same rate will cause nuts 66 and 68 to move lengthwise along the shafts in the same direction and at the same rate, so that the guide member 56 will move evenly with respect to the guide member 46.

Figure 6:
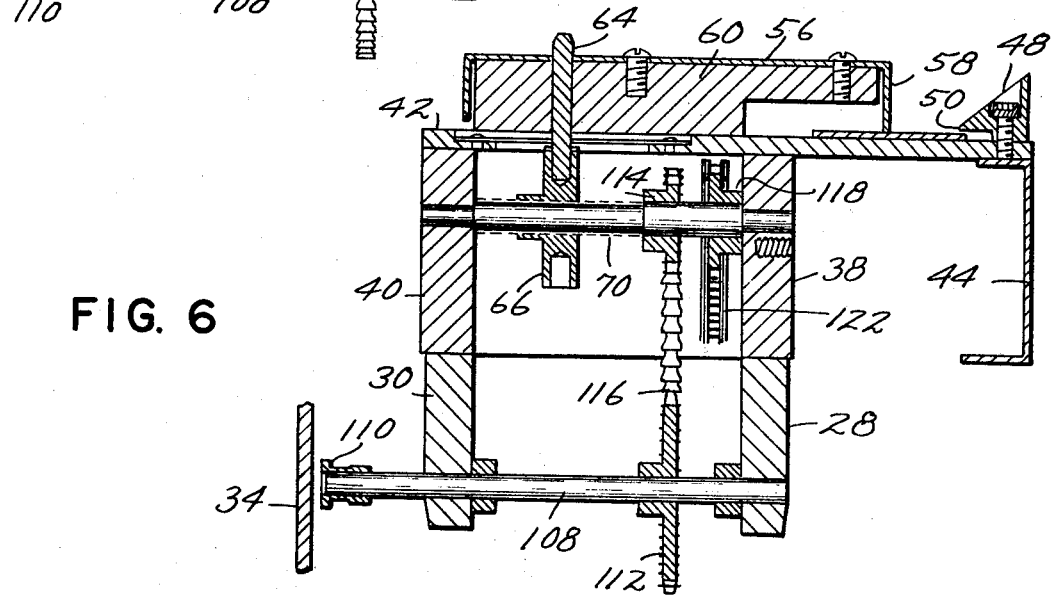
FIG. 6 is a cross-sectional view taken along line 6—6 of FIG. 3.
Figure 7:
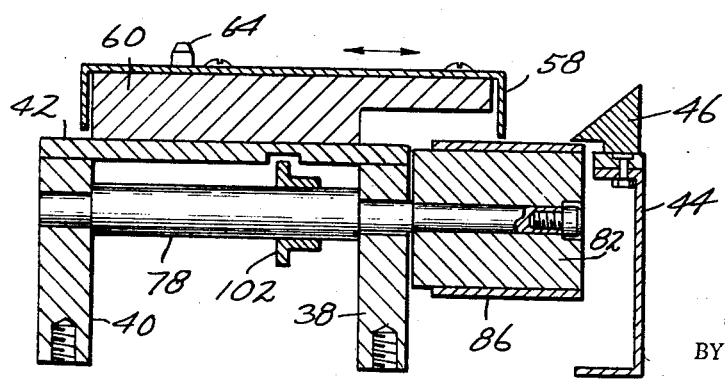
FIG. 7 is a cross-sectional view taken along line 7—7 of FIG. 3.
Figure 8:
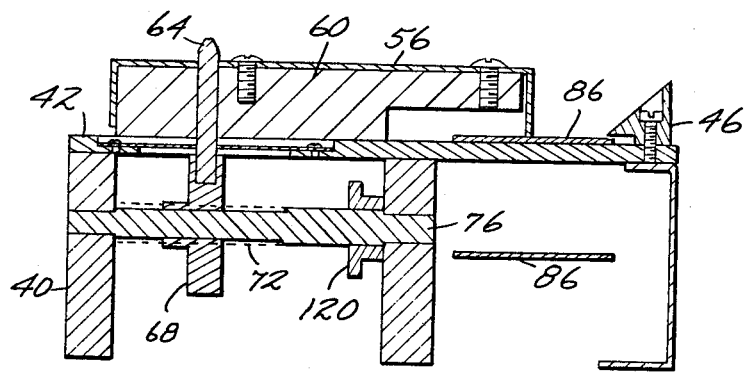
FIG. 8 is a cross-sectional view taken along line 8—8 of FIG. 3.
Figures 9, 10:
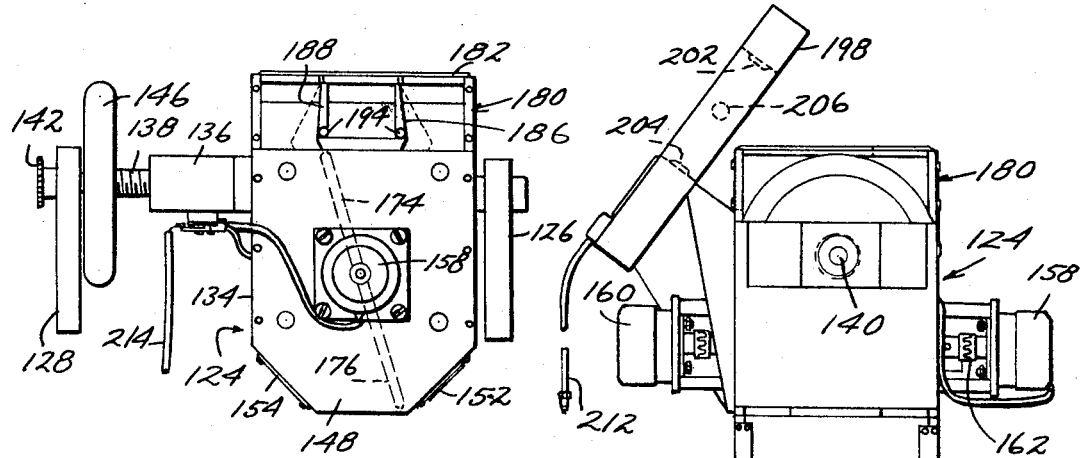
FIG. 9 is a front view in elevation on an enlarged scale of the batcher assembly.
FIG. 10 is a side view looking from left to right in FIG. 9 of the batcher assembly and the photoelectric article detector unit.
Figures 11, 12:
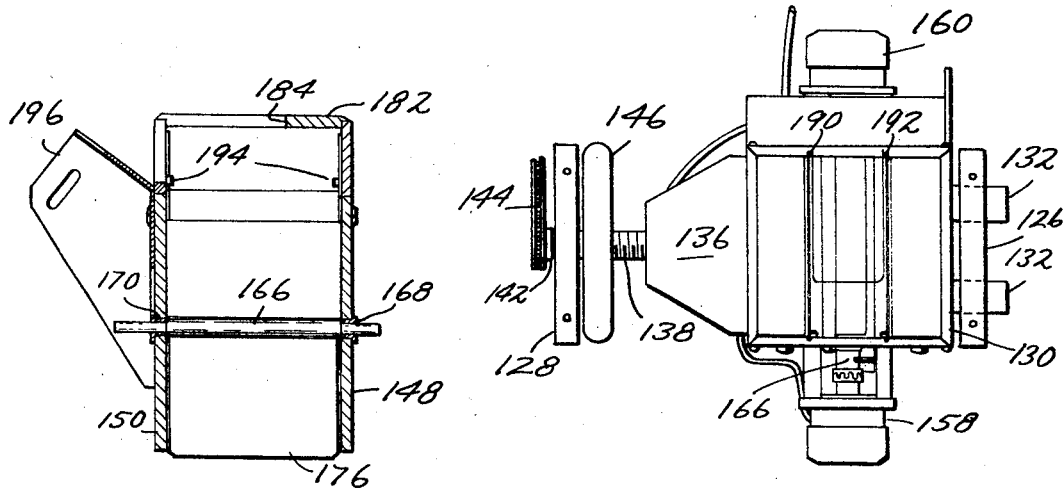
FIG. 11 is a cross-sectional view of a portion of the batcher assembly taken along line 11—11 of FIG. 9.
FIG. 12 is a plan view of the batcher assembly.

The two side plates 40 and 38 further support two other shafts 78 and 80 (see FIGS. 4 and 7). These shafts extend beyond the side plate 38 and carry pulleys 82 and 84. Shaft 78 is rotatable. Pulley 82 is affixed to shaft 78 so as to rotate therewith. Shaft 80 cannot rotate but pulley 84 is rotatably mounted thereon so as to function as an idler pulley. These pulleys support a conveyer belt 86. Also secured in the side plate 38 is a stub shaft 88 on which is mounted a smaller pulley 90. Although not shown, it is to be understood that shaft 88 is adjustably mounted so that pulley 90 can be moved in a direction to apply more or less tension on a conveyer belt 86. As seen in FIGS. 6, 7 and 8, the two guide members 46 and 52 overhang but are spaced from the conveyer belt. The conveyer belt is driven by a motor 92 acting through a speed reducer 94. The output shaft 96 of speed reducer 94 carries a sprocket 98 on which is mounted a drive chain 100. This chain rides on and drives a sprocket 102 that is mounted on shaft 78. The motor and the speed reducer are disposed within the vertical extension of the cabinet and the side panel 32 is provided with an opening that is concealed by a removable cover plate 106 to provide access to the motor and the speed reducer. Although not shown, it is to be understood that the motor is unidirectional and operates at a fixed speed.

Figure 5:
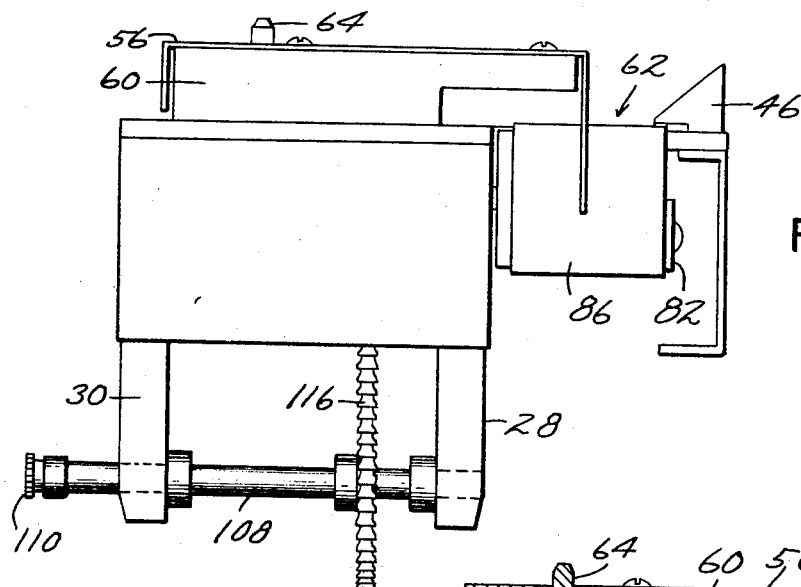
FIG. 5 is an enlarged end view in elevation of the article conveying and guiding section of the machine.

Referring now to FIGS. 5 and 6, the two bottom side plates 28 and 30 rotatably support a shaft 108. This shaft projects beyond the side plate 30 and its projecting end is fitted with a sprocket 110. Mounted on and rotatable with shaft 108 is a large sprocket 112. This sprocket is aligned with another smaller sprocket 114 that is mounted on and rotates with shaft 74. A drive chain 116 couples sprockets 112 and 114. Shaft 74 also carries another sprocket 118. This sprocket is aligned with a like sprocket 120 (FIG. 8) affixed to shaft 76. A chain 122 couples sprockets 118 and 120. With this arrangement, rotation of shaft 108 will cause shafts 74 and 76 to rotate in the same direction. Since sprockets 118 and 120 are the same size, shaft 76 will rotate at the same speed as shaft 74. Shaft 108 is rotated through sprocket 110 by drive means hereinafter described forming part of the batcher assembly 10.

Referring now to FIGS. 2 and 9–12, the batcher assembly comprises a housing 124 that is supported between two frame members 126 and 128 that are connected (by means not shown) to the frame of which top side plates 38 and 40 are an integral part. One side wall 130 of batcher housing 124 carries two round stub shafts 132 that make sliding fits with two holes in frame member 126. The other side wall 134 of housing 124 carries a block 136 provided with a tapped hole to receive the threaded portion 138 of a shaft 140. The remaining portion of shaft 140 is unthreaded and is rotatably secured in side plate 128 so that it cannot move axially. Affixed to the outer end of shaft 140 which projects beyond side plate 128 is a sprocket 142. A chain 144 connects sprocket 142 to sprocket 110. Also affixed to shaft 140 is a large hand wheel 146. It is believed to be apparent that rotation of shaft 140 by means of hand wheel 146 will cause rotation of shaft 108 which in turn will cause rotation of shafts 74 and 76 to produce movement of movable guide member 56. Rotation of shaft 140 also causes the batcher housing 124 to move laterally, with the direction of movement of the housing depending upon the direction of rotation of shaft 140.

The front and rear walls 148 and 150 of batcher housing 124 extend below its two side walls and are bevelled at their bottom corners. Removably secured to the bevelled corners of front and rear walls 148 and 150 are two auxiliary side wall members 152 and 154. These auxiliary side wall members and the front and rear walls define a rectangular discharge opening at the bottom of the housing. Mounted on the front and rear walls of batcher housing 124 are rotary solenoid units 158 and 160. The output shafts of these solenoid units are coupled by flexible couplings 162 to the opposite ends of a shaft 166. Shaft 166 extends through housing 124 and is journaled in its front and rear walls as shown at 168 and 170 in FIG. 11. This shaft 166 forms part of an article diverter in the form of a butterfly valve assembly which also includes two flat vanes 174 and 176. These vanes are attached to shaft 166 at diametrically opposite points and are coplanar with each other. It is to be understood that operation of one solenoid rotates the butterfly valve assembly in one direction and operation of the other solenoid rotates the butterfly valve assembly in the opposite direction. The butterfly valve assembly always occupies one of two limit positions, depending upon which solenoid has been actuated. In one limit position the bottom vane 176 engages the auxiliary side wall member 152 at its lower edge substantially as shown in phantom in FIG. 9. The other limit position is the reverse of that shown in FIG. 9 with vane 176 engaging the lower edge of auxiliary side wall member 154. The open upper end of the batcher housing is fitted with a rectangular cover identified generally by numeral 180. This cover is preferably formed of transparent plastic such as Lucite®. The top wall 182 of this cover is formed with a rectangular opening 184 whose center line is aligned with the axis of shaft 166. This opening 184 starts at the rear side of the batcher cover and terminates a short distance from the front side. The cover is also provided with two deflectors 186 and 188. The upper ends of these deflectors are hinged at 190 and 192 to the front and rear walls of the cover. Two pins 194 mounted in the front wall of the cover limit the extent to which these deflector members can swing towards each other but leave them free to swing away from each other. The purpose of deflectors 186 and 188 is to direct articles introduced through hole 184 so that they will not fly around the batcher housing but instead drop down onto the butterfly valve assembly and collect at one side or the other of the housing, depending upon the immediate position of the butterfly valve assembly.

Attached to the rear wall 141 of the housing is a bracket 196. Attached to this bracket 196 is the photoelectric detector unit 8. This unit comprises a rectangular housing 198 having a rectangular aperture 200 (see FIG. 1). The housing 198 carries a light source 202 located at one side of the aperture. This light source is directed at a phototransistor (or photodiode) 204 located at the opposite side of the aperture. Preferably, but not necessary, the detector unit may include a second light source 206 located in the third side of the aperture and directed at a second phototransistor (not shown) located in the fourth side of the aperture. The detector unit housing 198 is supported at an angle to the batcher housing 124 with the aperture 200 located so that articles traveling along conveyor belt 86 and discharged therefrom into the batcher housing will pass through the aperture 200. Each time an article passes through aperture 200, it will intercept one or both of the light beams and thereby cause one or both of the phototransistors to generate an output signal pulse. Such signal pulses are applied as inputs to counter 12. It is to be understood that counter 12 is adapted to respond to one or the other of the phototransistors and, in the event both phototransistors respond simultaneously to the same article, only one signal pulse is sensed and counted by the counter. Electrical coupling of the detector unit and the counter is achieved by a flexible cable 212. A second cable 214 connects solenoids 158 and 160 to the output stage of the counter.

Referring again to FIGS. 5–9, the ratios of the various sprockets in the drive train connecting shaft 140 and shafts 74 and 76 are such that when hand wheel 146 is rotated, the batcher housing 124 and guide member 56 will be moved in the same direction, but the housing will travel at one half the rate of travel of guide member 56. By way of example, in the preferred embodiment of my invention this ratio of movement is achieved by 20 threads/inch on the threaded portions of shafts 74 and 76, and 10 threads/inch on the threaded portion of shaft 140, while the sprockets 110 and 142 have a 1:1 ratio, and sprockets 112 and 114 have a 4:1 ratio. Of course the batcher housing is mounted so that at the outset the shaft 166 of its butterfly valve and the vertical center line of hole 200 of the detector unit are both aligned with the center line of the channel formed by guide members 46 and 56, and this relationship is maintained by the aforesaid drive mechanism as the width of the article channel is varied by movement of guide member 56.

It is to be noted that the relationship of guide member 46 is fixed with respect to the bowl 16. In practice, the guide member 46 is located so that it can guide but not interfere with articles as they leave the ramp 22. Accordingly the inner edge 50 of guide member 46 should be at least even with the inner edge 22A of the ramp at the point of discharge and preferably it slightly overlaps the ramp as shown. In this connection it is to be noted that the width of the ramp floor is such that articles advancing with the proper orientation will not project over the inner edge of the ramp but will be some distance therefrom and hence will not strike and be obstructed by the upstream end of fixed guide member 46 in its predetermined position. With guide member 46 fixed with respect to the ramp, within a predetermined range of article size, the only adjustment required to be made to achieve proper transfer of articles from the bowl to the conveyer belt in single file is changing the width of the channel defined by the two guide members, and this is achieved by operating the hand wheel 146 in the manner previously described. In this connection two further features are to be noted. First of all, a series of graduations 216 are provided along the front edge of plate 42. These graduations may be according to any convenient subdivision, e.g., sixteenths of an inch or millimeters, and are arranged so that the graduation nearest to a reference mark 218 on the front edge of support block 60 indicates the width of the article channel. The other feature concerns the removable extension 26 of the feeder bowl. As the articles properly oriented approach the discharge point of the ramp, it is necessary for proper operation that they not move away from the vertical wall of the ramp toward the ramp's inner edge where they may strike the upstream end of guide member 46 and be prevented from entering the article channel. The removeable extension 26 is L-shaped in cross-section and is mounted so that its floor portion 26A functions as part of the floor of the upper end of ramp 22. It is to be noted that the ramp is formed without a side wall for a substantial distance back from its discharge point in order to accommodate removeable extension 26. With extension 26 in place the width of the floor of the upper end of the ramp is at least the same and preferably greater than that of the rest of the ramp (the latter is true in FIG. 3). Extension 26 is also made so that the angle between its vertical wall 26B and its floor portion 26A is about 60°. This arrangement assures that articles advancing toward the discharge point of the ramp will tend to hug the vertical wall of the ramp and be spaced from its inner edge so as not to be obstructed by fixed guide 46. This arrangement is suitable over a limited range of article size. For a larger size article, the extension 26 is replaced with another having a floor portion of a different appropriate width.

Operation of the machine described above is believed to be obvious to persons skilled in the art and is generally as described below.

Assume that a supply of selected articles of predetermined size are to be counted and batched by the machine. Using the graduations 216 as a guide, the first task of the operator is to rotate the hand wheel 146 until the channel 62 has the proper width for the articles to be processed. Thereafter a supply of the articles to be counted is dumped into bowl 16 and the conveyer motor 92 is energized. At the same time counter 12 is activated. Thereafter the vibrating unit 18 is energized. As soon as the vibrator unit is energized articles will commence to move upward along the ramp 22 and will advance to its discharge point. As they are discharged from the ramp 22 they are picked up by the conveyer belt 86 and transported toward the detector unit 8. The articles are transported in single file, being channeled by the guide members 46 and 56. As each article passes through opening 200 of the detector unit, a pulse is generated by the latter and transmitted to the counter. Succeeding pulses generated by other articles are similarly received by the counter which maintains a running count. The articles pass through the detector unit and fall into the batcher housing where they collect on one side or the other of the housing depending upon the immediate position of the butterfly valve assembly. When a predetermined count has been reached, the counter automatically produces an output signal that is used to energize one of the solenoids 158 and 160, causing the butterfly valve assembly to reverse its position. As the butterfly valve assembly changes position the articles previously collected in the batcher housing are discharged out of the bottom of the housing into a suitable receptacle (not shown). Articles continuing to fall into the batcher housing will collect on the other side of the housing. These in turn will be discharged from the housing when the butterfly valve assembly is returned to its initial position. This return movement will result when the counter next produces an output signal. This counting and batching operation will continue until the supply of articles is exhausted or until the vibrator unit 18 is shut down.

It is to be understood that the batcher housing may be modified so that articles do not collect therein but instead are discharged as rapidly as they are received, with the butterfly valve assembly functioning merely as a diverter. This alternate mode of operation is easily achieved by removing the auxiliary wall members 152 and 154.

It is to be noted also that the movable guide member may be removed merely by lifting it off of pins 64. This facilitates initial aligning of the movable guide member which is achieved by rotating nuts 66 and 70 on shafts 74 and 76.

It is to be understood that the invention is not limited in its application to the details of construction and arrangement of parts specifically described or illustrated, and that within the scope of the appended claims, it may be practiced otherwise than as specifically described or illustrated.

I claim:
1. In combination with an endless conveyer having an elongated run, first and second guide members for channeling articles deposited on said conveyer into a single column along said run, said guide members having opposed parallel edges defining an article-guiding channel, means securing said first guide member in fixed relation to said conveyer, means supporting said second guide member for movement toward and away from said one guide member, means positioned to receive articles transported by said conveyer, said article-receiving means including an article detector unit for detecting each article as it leaves said conveyer, said detector unit being disposed in a predetermined relation to the center line of said channel, first means for moving said second guide member relative to said first guide member so as to vary the width of said channel, and second means for moving said article-receiving means, said second means being coupled to said first means and being adapted to maintain constant the relation of said detector unit to said center line.

2. The combination of claim 1 wherein said article-receiving means is adapted to collect articles in batches and to release said batches on command, said article-receiving means comprising a housing with an article discharge opening, and means in said housing adapted to impede flow of articles to said discharge opening so that they will collect in batches and operative to release each batch to said discharge opening.

3. The combination of claim 1 wherein said detector unit has an enlarged opening and is positioned so that articles moving from said conveyer to said article-receiving means pass through said enlarged opening.

4. The combination of claim 3 wherein said detector unit comprises a light source positioned to direct a light beam across said enlarged opening in the path of articles moving to said article-receiving means, photoelectric means for generating an output signal each time said beam is interrupted by a moving article, and means for counting each output signal.

5. The combination of claim 1 wherein said second means comprises a threaded shaft, and further wherein said article-receiving means is mounted on and is movable along said threaded shaft.

6. The combination of claim 5 further including a hand wheel for rotating said threaded shaft.

7. Apparatus for counting articles comprising a conveyer, means for driving said conveyer in a predetermined direction, means for delivering articles one by one to said conveyer, guide means for channeling articles in single file on said conveyer, said guide means comprising a fixed guide member and a moveable guide member coacting to provide a channel for articles on said conveyer, detector means for detecting articles as they move out from said channel, said detector means being aligned with the center line of said channel, first drive means for moving said moveable guide member to vary the width of said channel, and second drive means for moving said detector means with said moveable guide means so as to maintain it aligned with said center line.

8. Apparatus as defined by claim 7 wherein said detector means is located beyond the end of said conveyer and is supported on a laterally moveable mechanism forming part of said second drive means, and further wherein said first and second drive means are coupled to each other.

9. Apparatus as defined by claim 7 wherein said means for delivering articles to said conveyer is a vibratory feeder comprising a vibrator unit and a supply bowl mounted on and vibrated by said vibrator unit, said supply bowl comprising a helical ramp along which articles advance as said bowl is vibrated, said ramp terminating at the upstream end of said conveyer in alignment with said channel.

10. Apparatus as defined by claim 9 wherein said fixed guide member is aligned with the outer edge of said ramp.

11. Apparatus as defined by claim 9 wherein said bowl includes means for adjusting the width of the upper end of said ramp.

References Cited
UNITED STATES PATENTS

| | | | |
|---|---|---|---|
| 2,493,464 | 1/1950 | Nelson | 198—40 |
| 3,001,636 | 9/1961 | Klapes | 198—204 |

RICHARD E. AEGERTER, *Primary Examiner.*